(12) United States Patent
Nakai et al.

(10) Patent No.: US 9,213,897 B2
(45) Date of Patent: Dec. 15, 2015

(54) IMAGE PROCESSING DEVICE AND METHOD

(71) Applicant: FUJITSU LIMITED, Kawasaki-shi, Kanagawa (JP)

(72) Inventors: Takehiro Nakai, Kawasaki (JP); Atsunori Moteki, Kawasaki (JP); Katsuhito Fujimoto, Kawasaki (JP); Nobuyuki Hara, Meguro (JP); Noriaki Ozawa, Kawasaki (JP); Taichi Murase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 13/650,711

(22) Filed: Oct. 12, 2012

(65) Prior Publication Data
US 2013/0148849 A1    Jun. 13, 2013

(30) Foreign Application Priority Data
Dec. 7, 2011    (JP) .................................. 2011-268378

(51) Int. Cl.
| G06K 9/00 | (2006.01) |
| G06K 9/22 | (2006.01) |
| G06K 9/32 | (2006.01) |
| G06K 9/46 | (2006.01) |

(52) U.S. Cl.
CPC ............ *G06K 9/00664* (2013.01); *G06K 9/228* (2013.01); *G06K 9/3241* (2013.01); *G06K 9/4609* (2013.01)

(58) Field of Classification Search
None
See application file for complete search history.

(56) References Cited

U.S. PATENT DOCUMENTS

| 6,128,003 A | 10/2000 | Smith et al. |
| 6,236,736 B1 * | 5/2001 | Crabtree et al. ............... 382/103 |
| 6,625,299 B1 * | 9/2003 | Meisner et al. ............... 382/103 |
| 6,711,293 B1 | 3/2004 | Lowe |

(Continued)

FOREIGN PATENT DOCUMENTS

| JP | 10-214346 | 8/1998 |
| JP | 2005-173877 | 6/2005 |

(Continued)

OTHER PUBLICATIONS

Herbert Bay et al., "Speeded-Up Robust Features (SURF)", Computer Vision and Image Understanding, Jun. 2008, vol. 110, No. 3, pp. 346-359.

(Continued)

*Primary Examiner* — Avinash Yentrapati
(74) *Attorney, Agent, or Firm* — Staas & Halsey LLP

(57) ABSTRACT

An image processing device that accesses a storage unit that stores a feature point of a recognition-target object, the device includes an obtaining unit mounted with a user and configured to obtain image data in a direction of a field of view of the user; a recognizing unit configured to recognize the recognition-target object included in the image data by extracting a feature point from the image data and associating the extracted feature point and the feature point of the recognition-target object stored in the storage unit with each other; a calculating unit configured to calculate a location change amount of the feature point corresponding to the recognition-target object recognized by the recognizing unit from a plurality of the image data obtained at different times and calculate a motion vector of the recognition-target object from the location change amount; and a determining unit configured to determine a movement.

19 Claims, 15 Drawing Sheets

(56) References Cited

U.S. PATENT DOCUMENTS

| | | |
|---|---|---|
| 7,239,339 B2 * | 7/2007 | Nagai et al. .................... 348/116 |
| 8,325,982 B1 * | 12/2012 | Moon et al. .................... 382/103 |
| 2001/0055063 A1 * | 12/2001 | Nagai et al. .................... 348/116 |
| 2005/0129276 A1 * | 6/2005 | Haynes et al. ................. 382/103 |
| 2008/0243614 A1 * | 10/2008 | Tu et al. ........................... 705/14 |
| 2008/0249835 A1 * | 10/2008 | Angell et al. ................... 705/10 |
| 2009/0087028 A1 * | 4/2009 | Lacey et al. .................... 382/103 |
| 2011/0001695 A1 | 1/2011 | Suzuki et al. |
| 2011/0026770 A1 * | 2/2011 | Brookshire .................... 382/103 |
| 2011/0234386 A1 | 9/2011 | Matsuda |
| 2012/0185094 A1 * | 7/2012 | Rosenstein et al. ........... 700/259 |

FOREIGN PATENT DOCUMENTS

| | | |
|---|---|---|
| JP | 2006-243784 | 9/2006 |
| JP | 2007-316882 | 12/2007 |
| JP | 2010-067062 | 3/2010 |
| JP | 2011-014082 | 1/2011 |
| JP | 2011-209965 | 10/2011 |

OTHER PUBLICATIONS

Thomas Kailath, "Divergence and Bhattacharyya Distance Measures in Signal Selection", IEEE Transactions on Communication Technology, vol. Com-15, No. 1, Feb. 1967, pp. 52-60.

Haiyuan Wu et al., "Head Gesture Recognition from Time-varying Color images," Journal of Information Processing, vol. 40, No. 2, Feb. 15, 1999, pp. 577-584.

Japanese Office Action dated Apr. 28, 2015 in corresponding Japanese Patent Application No. 2011-268378, 4 pages.

* cited by examiner

FIG. 3

| CORRESPONDING ID | FEATURE POINT GROUP EXTRACTED FROM IMAGE OBTAINED BY OBTAINING UNIT | | | FEATURE POINT GROUP OF ONE RECOGNITION-TARGET OBJECT SELECTED FROM OBTAINING UNIT | | |
|---|---|---|---|---|---|---|
| | FEATURE POINT LOCATION (x, y) | DIRECTION (DEGREE) | FEATURE AMOUNT VECTOR (128 DIMENSIONS) | FEATURE POINT LOCATION (x, y) | DIRECTION (DEGREE) | FEATURE AMOUNT VECTOR (128 DIMENSIONS) |
| 1 | (510,50) | 24.9 | 0.420,0.351, 0.943,... | (300,30) | 26.8 | 0.435,0.395, 0.992,... |
| 2 | (560,80) | 169.4 | 0.946,0.796, 0.701,... | (310,80) | 173.2 | 0.931,0.785, 0.693,... |
| 3 | (550,180) | 97.9 | 0.267,0.408, 0.288,... | (350,150) | 98.4 | 0.271,0.396, 0.278,... |
| 4 | (560,240) | 69.2 | 0.698,0.202, 0.482,... | (300,320) | 67.1 | 0.679,0.164, 0.498,... |
| 5 | (140,300) | 107.4 | 0.536,0.437, 0.731,... | (310,350) | 111.9 | 0.523,0.439, 0.726,... |
| ... | ... | ... | ... | ... | ... | ... |

FIG. 4B

| CORRESPONDING ID | FEATURE POINT GROUP EXTRACTED FROM IMAGE OBTAINED BY OBTAINING UNIT | | | FEATURE POINT GROUP OF ONE RECOGNITION-TARGET OBJECT SELECTED FROM OBTAINING UNIT | | | FEATURE POINT SET | |
|---|---|---|---|---|---|---|---|---|
| | FEATURE POINT LOCATION (x, y) | DIRECTION (DEGREE) | FEATURE AMOUNT VECTOR (128 DIMENSIONS) | FEATURE POINT LOCATION (x, y) | DIRECTION (DEGREE) | FEATURE AMOUNT VECTOR (128 DIMENSIONS) | SET U1 | SET U2 |
| 1 | (510,50) | 24.9 | 0.420,0.351, 0.943,... | (300,30) | 26.8 | 0.435,0.395, 0.992,... | ○ | ○ |
| 2 | (560,80) | 169.4 | 0.946,0.796, 0.701,... | (310,80) | 173.2 | 0.931,0.785, 0.693,... | ○ | ○ |
| 3 | (550,180) | 97.9 | 0.267,0.408, 0.288,... | (350,150) | 98.4 | 0.271,0.396, 0.278,... | ○ | ○ |
| 4 | (560,240) | 69.2 | 0.698,0.202, 0.482,... | (300,320) | 67.1 | 0.679,0.164, 0.498,... | ○ | ○ |
| ~~5~~ | ~~(140,300)~~ | ~~107.4~~ | ~~0.536,0.437, 0.731,...~~ | ~~(310,350)~~ | ~~111.9~~ | ~~0.523,0.439, 0.726,...~~ | ~~×~~ | ~~○~~ |
| ... | ... | ... | ... | ... | ... | ... | ... | ... |

ID DELETION

FIG. 6A

```
START
  ↓
STORE MOTION VECTOR (x", y") OF
RECOGNITION-TARGET OBJECT CALCULATED BY  ~S301
CALCULATING UNIT
  ↓
S302
HAVE MOTION VECTORS
(x", y") OF PREDETERMINED NUMBER OF  —NO→ (loop back to START)
FRAMES BEEN STORED?
  ↓YES
AVERAGE STORED MOTION VECTORS (x", y")  ~S303
  ↓
REFER TO USER MOVEMENT CORRESPONDENCE
TABLE TO DETERMINE USER MOVEMENT  ~S304
  ↓
DELETE STORED MOTION VECTORS (x", y")  ~S305
  ↓
RETURN
```

FIG. 6B

| REFERENCE MOTION VECTOR (x", y") | TOLERANCE RANGE (±x", ±y") | USER MOVEMENT |
|---|---|---|
| (10, 0) | (±3, ±3) | TURN HEAD TO LEFT |
| (-10, 0) | (±3, ±3) | TURN HEAD TO RIGHT |
| (0, 8) | (±3, ±3) | TURN HEAD UP |
| (0, -8) | (±3, ±3) | TURN HEAD DOWN |

FIG. 7

| RECOGNITION-TARGET OBJECT | USER MOVEMENT | AUXILIARY INFORMATION TO BE DISPLAYED ON DISPLAY UNIT |
|---|---|---|
| CANNED COFFEE | TURN HEAD TO LEFT | CAMPAIGN INFORMATION |
| | TURN HEAD TO RIGHT | CALORIE INDICATION |
| | TURN HEAD UP | PRICE |
| | TURN HEAD DOWN | CANCEL (TURN DISPLAY OFF) |
| SUPERMARKET SIGNBOARD | TURN HEAD TO LEFT | SALE INFORMATION |
| | TURN HEAD TO RIGHT | TELEPHONE NUMBER |
| | TURN HEAD UP | RELATED URL DISPLAY |
| | TURN HEAD DOWN | CANCEL (TURN DISPLAY OFF) |
| ... | ... | ... |

FIG. 9A

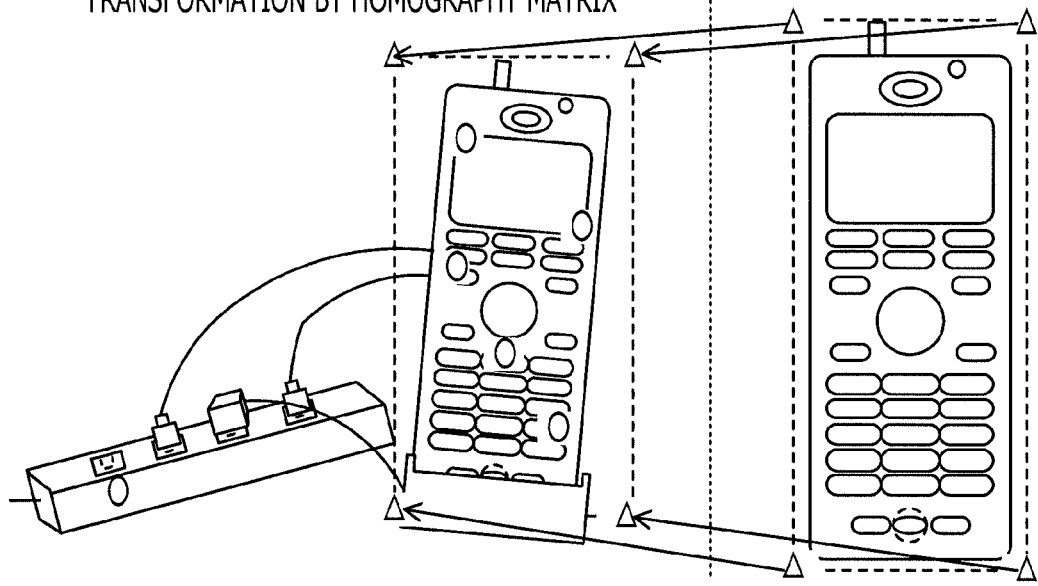

FEATURE POINTS (○) OF RECOGNITION-TARGET OBJECT RECOGNIZED BY RECOGNIZING UNIT AND FOUR ENDPOINTS (△) CONTAINING OBJECT AFTER PROJECTIVE TRANSFORMATION BY HOMOGRAPHY MATRIX

FOUR ENDPOINTS (△) OF RECOGNITION-TARGET OBJECT STORED IN STORAGE UNIT

FIG. 9B

| ENDPOINT ID | LOCATION (x, y) OF ENDPOINT OF FOUR ENDPOINTS CONTAINING RECOGNITION-TARGET OBJECT AFTER PROJECTIVE TRANSFORMATION BY HOMOGRAPHY MATRIX | LOCATION (x, y) OF ENDPOINT OF FOUR ENDPOINTS OF RECOGNITION-TARGET OBJECT STORED IN STORAGE UNIT |
|---|---|---|
| 1 | (410,60) | (200,50) |
| 2 | (420,350) | (200,300) |
| 3 | (480,360) | (350,300) |
| 4 | (350,65) | (350,50) |

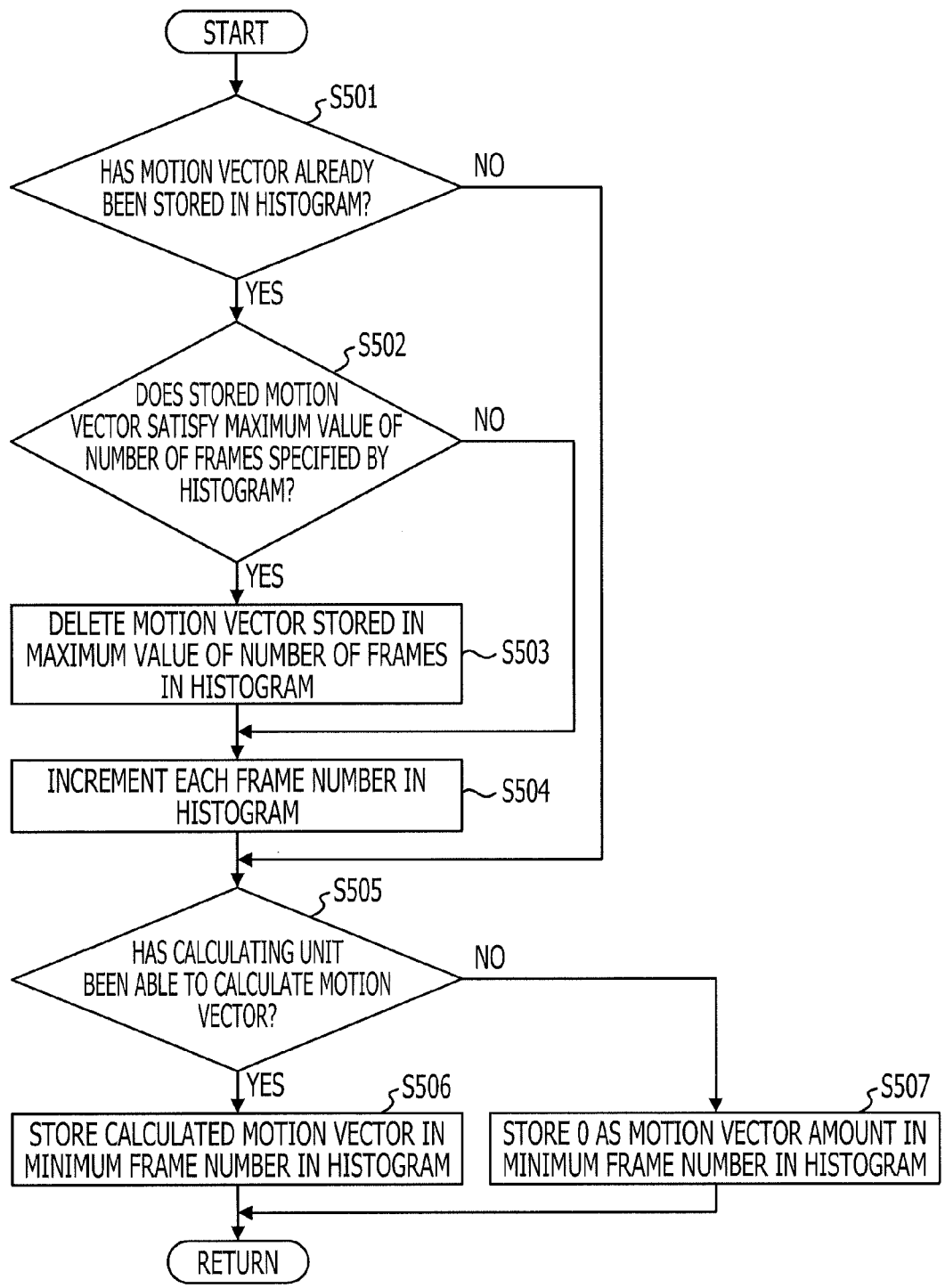

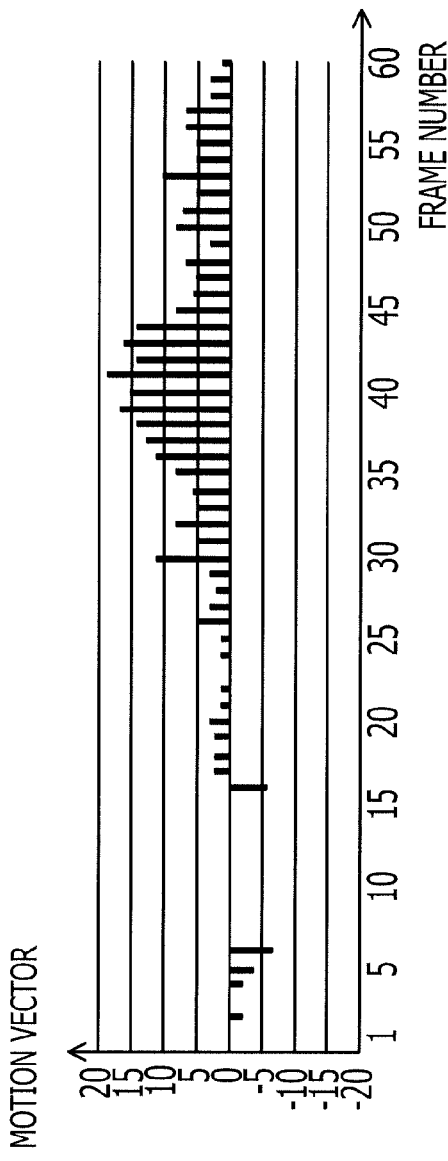

IMAGE PROCESSING DEVICE AND METHOD

CROSS-REFERENCE TO RELATED APPLICATION(S)

This application is based upon and claims the benefit of priority of the prior Japanese Patent Application No. 2011-268378, filed on Dec. 7, 2011, the entire contents of which are incorporated herein by reference.

FIELD

The embodiments discussed herein relate to an image processing device, image processing method, and computer-readable recording medium having an image processing program stored therein, which are used for the determination of a user movement, for example.

BACKGROUND

In recent years, with advance of information communication technologies, a technology regarding augmented reality, in which visual information is added to an image obtained by imaging a real environment (outside) by using a computer has been developed. For display of the visual information, a wearable device such as an HMD (head mounted display) equipped with a camera for obtaining an outside image is mainly used to display detailed information regarding an object present in a direction of a field of view of a user (hereinafter referred to auxiliary information) as being superposed on the outside image. The auxiliary information includes information obtained from the outer appearance of the object, as well as information not appearing from the outer appearance of the object, such as an environment where the object was manufactured and information about reputations about the object from other users.

Here, when the user selectively obtains any one piece of auxiliary information from among a plurality of pieces of auxiliary information, an operation of an input device from the user is performed. In an example of the input device, a conventional input device may be used such as a mouse or keyboard. As a simple and efficient input method, a method of using a movement (a gesture) of the user as an input tool has attracted attention. An example of technology in which a user movement is used as an input tool is disclosed in Japanese Laid-open Patent Publication No. 10-214346 in which an acceleration sensor is used to determine a movement of fingers of the hands. Also, Japanese Laid-open Patent Publication No. 2011-14082 discloses a technology of determining a movement of a visual line by a visual line detecting device mounted with a wearable device.

Also, a method of using a movement of the head (including the neck) allowing hands-free or eyes-free recognition of a user movement has also attracted attention. In a recognizing method by a movement of the head, a user movement that reflects the intentions in actual human daily movements such as nodding or rejection may be used.

As an example of the method of using a movement of the head, Haiyuan Wu, et. al., "Head Gesture Recognition from Time-Varying Color Images", *Journal of Information Processing*, 40(2), pp. 577-584, 1999 discloses a technology in which a movement of the head is determined by finding the location of the head from a sensor placed outside. Also, Japanese Laid-open Patent Publication No. 2006-243784 discloses a technology in which a movement of the head is determined by analyzing a value obtained from an acceleration sensor mounted with the head of the user.

SUMMARY

In accordance with an aspect of the embodiments, an image processing device that accesses a storage unit that stores a feature point of a recognition-target object, the device includes an obtaining unit mounted with a user and configured to obtain image data in a direction of a field of view of the user; a recognizing unit configured to recognize the recognition-target object included in the image data by extracting a feature point from the image data and associating the extracted feature point and the feature point of the recognition-target object stored in the storage unit with each other; a calculating unit configured to calculate a location change amount of the feature point corresponding to the recognition-target object recognized by the recognizing unit from a plurality of the image data obtained at different times and calculate a motion vector of the recognition-target object from the location change amount; and a determining unit configured to determine a movement of the user based on the motion vector.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 is a diagram of an example of a data structure of feature points associated by the recognizing unit;

FIG. 4B is a diagram of an example of a data structure of feature points with improved robustness;

FIG. 6A is a flowchart of a process by a determining unit of determining a user movement based on the motion vector of the recognition-target object;

FIG. 6B is a user movement correspondence table in which motion vectors of a recognition-target object and user movements are associated with each other;

FIG. 7 is a table in which recognition-target objects, user movements, and auxiliary information are associated with one another;

FIG. 9A is a diagram depicting a correspondence among feature points of a recognition-target object recognized by the recognizing unit, four endpoints containing the recognition-target object after projective transformation by a homography matrix, and four endpoints of the recognition-target object stored in advance in a storage unit;

FIG. 9B is a diagram of an example of a data structure of locations of the four endpoints containing the recognition-target object after projective transformation by a homography matrix and locations of the four endpoints of the recognition-target object stored in advance in the storage unit;

FIG. 10 is a flowchart of a process by the determining unit of generating a histogram of motion vectors;

FIG. 13A depicts an example of a histogram of motion vectors generated by the determining unit in consideration of an outward path and a return path of a user movement of FIG. 12;

FIG. 13B depicts a model histogram in consideration of an outward path and a return path of a user movement.

DESCRIPTION OF EMBODIMENTS (First Embodiment)

Figure 1:
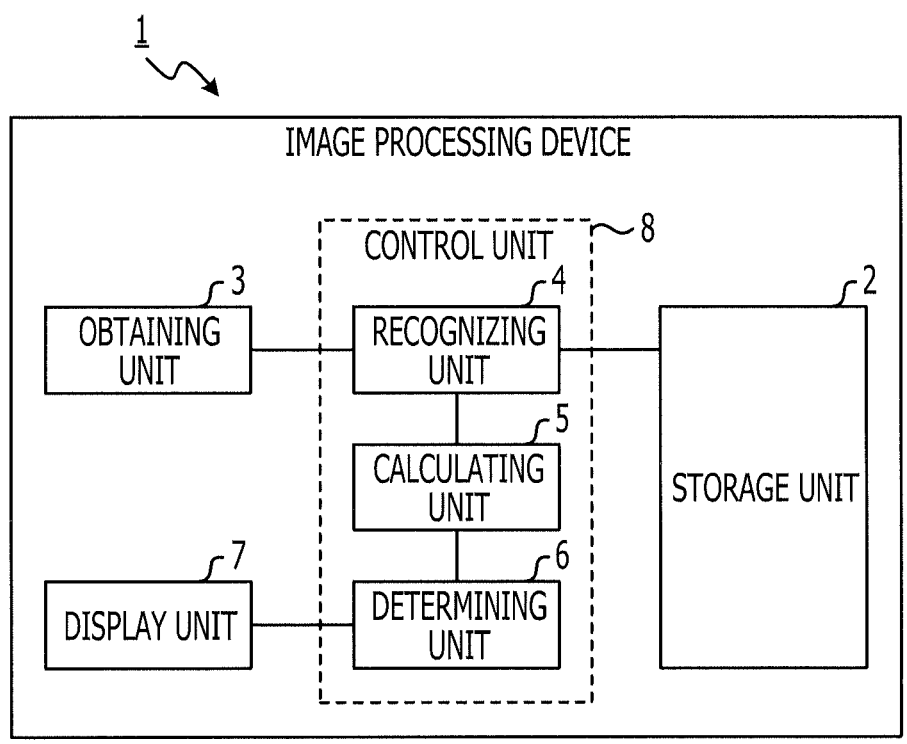
FIG. 1 is a functional block diagram of an image processing device according to an embodiment.

FIG. 1 is a diagram depicting functional blocks of an image processing device 1 according to an embodiment. The image processing device 1 has a storage unit 2, an obtaining unit 3, a recognizing unit 4, a calculating unit 5, a determining unit 6, a display unit 7, and a control unit 8.

The storage unit 2 is, for example, a semiconductor memory device such as a flash memory or a storage device such as a hard disk or an optical disk. Note that the storage device 13 is not restricted to the storage device of any type described above, and may be a RAM (random access memory) or a ROM (read only memory). In the storage unit 2, feature points of a plurality of recognition-target objects (such as signboards, products, and trees), which are externally present and may be subjected to a recognizing process, are stored as being extracted from an image obtained by imaging the recognition-target objects in advance. Furthermore, auxiliary information regarding the recognition-target objects and user movements corresponding to the auxiliary information are also stored in advance. Note that the feature points include information such as a feature point location, direction, or feature amount vector, which will be described further below.

Note that while the storage unit 2 is placed inside the image processing device 1 for convenience of description, the storage unit 2 may be placed outside the image processing device 1 so as to be accessible via a network. Also, in the storage unit 2, various programs to be executed in the control unit 8, which will be described further below, are stored, for example, a basic software program such as an OS (operating system) and a program in which an operation for image processing is defined. Furthermore, data to be used for executing the programs described above is also stored in the storage unit 2.

The obtaining unit 3 is, for example, an imaging device such as a CCD (charge coupled device) or CMOS (complementary metal oxide semiconductor) camera. The obtaining unit 3 is mounted with, for example, the head of a user, to obtain image data in a direction of a field of view of the user.

The recognizing unit 4 is, for example, a hardware circuit with a wired logic. The recognizing unit 4 may also be a functional module achieved by a computer program executed by the control unit 8. The recognizing unit 4 extracts feature points from a plurality of pieces of image data obtained by the obtaining unit 3 and associates the extracted feature points with feature points of the recognition-target objects stored in the storage unit 2, thereby recognizing at least one recognition-target object included in the plurality of pieces of image data obtained by the obtaining unit 3. Note that a detailed flow of a process to be executed by the recognizing unit 4 for recognizing a recognition-target object will be described further below.

The calculating unit 5 is, for example, a hardware circuit with a wired logic. The calculating unit 5 may also be a functional module achieved by a computer program executed by the control unit 8. The calculating unit 5 calculates a location change amount of a feature point in the recognition-target object recognized by the recognizing unit 4 from a plurality of pieces of image data obtained by the obtaining unit 3 at different times. From the location change amount, the calculating unit 5 then calculates a motion vector of the recognition-target object recognized by the recognizing unit 4.

Here, the definition of the location change amount of the feature point is described. First, each of the plurality of pieces of image data (individual image data) is defined as a frame. The location change amount of the feature point is defined as a change amount from a base point to an end point, where the base point indicates a location of any at least one feature point that is present in a time frame t and the end point indicates a location of that feature point in a previous time frame t−1 or a subsequent time frame t+1. Note that a detailed flow of a process to be performed by the calculating unit 5 of calculating a location change amount of the feature point and a motion vector of the recognition-target object will be described further below.

The determining unit 6 is, for example, a hardware circuit with a wired logic. The determining unit 6 may also be a functional module achieved by a computer program executed by the control unit 8. The determining unit 6 determines a user movement based on the motion vector of the recognition-target object calculated by the calculating unit 5. Specifically, the determining unit 6 retains, in a cache or memory not depicted herein, a user movement correspondence table in which motion vectors of the recognition-target object and user movements are associated with each other, and determines a user movement based on the table. For example, when the motion vector of the recognition-target object moves in a right direction over a section of a predetermined number of pieces of image data, it is determined that the user has turned his or her head in a left direction. Note that a detailed flow of a user movement determination by the determining unit 6 based on the motion vector of the recognition-target object will be described further below.

Note that in general, the motion of the head of a human such as nodding takes approximately one second although there are variations among individuals and therefore it is enough to perform the user movement determining process by the determining unit 6 once every one second. Also, the user movement time may be observed in advance, and the observed time may be used for the determining process.

The display unit 7 is, for example, a display device such as a display. The display unit 7 receives, from the storage unit 2, auxiliary information about a recognition-target object corresponding to the user movement determined by the determining unit 6, and displays the auxiliary information so as to superpose the auxiliary information on the recognition-target object recognized by the recognizing unit 4.

The control unit 8 is, for example, an integrated circuit such as an ASIC (application specific integrated circuit) or a FPGA (field programmable gate array) or an electronic circuit such as a CPU (central processing unit) or a MPU (micro processing unit). The control unit 8 has an internal memory for storing programs that define various process procedures and control data, and performs various processes with these programs and data. As depicted in FIG. 1, the control unit 8 is configured to include the recognizing unit 4, the calculating unit 5, and the determining unit 6.

(Process Flow of the Recognizing Unit 4)

Figure 2:
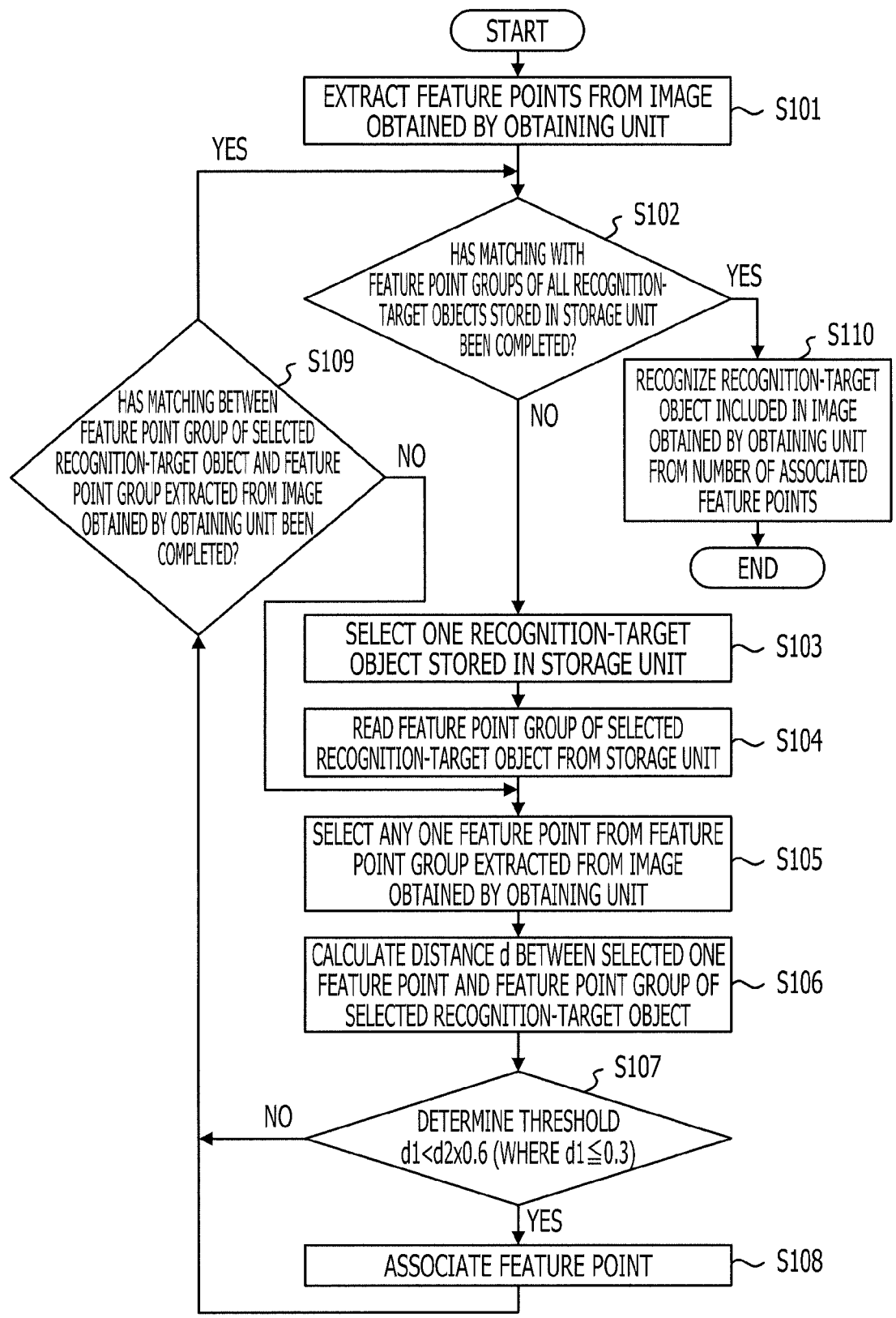
FIG. 2 is a flowchart of an object recognizing process by a recognizing unit.

FIG. 2 is a flowchart of an object recognizing process by the recognizing unit 4. First, the recognizing unit 4 receives a plurality of pieces of image data obtained at different times from the obtaining unit 3, and extracts a feature point from each of the plurality of pieces of image data (for each frame) (step S101). Note that a plurality of feature points are normally extracted and therefore a set of a plurality of feature points is defined as a feature point group.

The feature points to be extracted at step S101 are any as long as a feature amount vector for each feature point, which is called a descriptor, may be calculated. For example, a feature point in SIFT (scale invariant feature transform) or in SURF (speeded up robust features) may be used. Note that an example of a method of extracting a feature point in SIFT is disclosed in U.S. Pat. No. 6,711,293. An example of a SURF extracting method is disclosed in H. Bay, et. al., "SURF: Speeded Up Robust Features", *Computer Vision and Image Understanding*, Vol. 110, No. 3, pp. 346-359, 2008.

The recognizing unit 4 next determines whether matching between the feature point group extracted by the recognizing unit 4 at step S101 and a feature point group of all recognition-target objects stored in the storage unit 2 has been completed (step S102). Note that feature points in SIFT or SURF described above are assumed to be stored in advance as the feature point group of the recognition-target objects stored in the storage unit 2. If matching has not been completed at step S102, the recognizing unit 4 selects any one recognition-target object stored in advance in the storage unit 2 (step S103). The recognizing unit 4 next reads, from the storage unit 2, a feature point group of the recognition-target object selected at step S103 (step S104). The recognizing unit 4 then selects any one feature point from the feature point group extracted at step S104 (step S105).

The recognizing unit 4 searches for a correspondence between one feature point selected at step S105 and the feature point of the selected recognition-target object read at step S104. As a searching method, a matching process by a general correspondence point search may be used. Specifically, the recognizing unit 4 calculates a distance d between one feature point selected at step S105 and each point in the feature point group of the selected recognition-target object read at step S104 (step S106).

The recognizing unit 4 next performs a threshold determination for determining validity of correspondence of the feature points. Specifically, at step S106, a smallest value d1 and a second smallest value d2 among the calculated distances d are calculated. The recognizing unit 4 then determines whether the following conditions are satisfied: the distances of d1 and d2 for a threshold determination are each equal to or larger than a predetermined distance (for example, d1 is smaller than a value obtained by multiplying d2 by 0.6) and d1 is equal to or smaller than a predetermined value (for example, equal to or smaller than 0.3) (step S107). When the threshold determination conditions are satisfied at step S107, the recognizing unit 4 associates the feature points together (step S108). When the conditions are not satisfied, association of the feature points is not performed, and the process goes to step S109.

The recognizing unit 4 determines whether matching between the feature point group read at step S104 and the feature point group extracted at step S101 has all been completed (step S109). If matching has been all completed, the process of the recognizing unit 4 goes to step S102 and then goes to step S110. If matching has not been completed, the process goes to step S105. The recognizing unit 4 then recognizes at least one recognition-target object included in an image obtained by the obtaining unit 3 based on the number of feature points associated at step S108 (step S110).

In this manner, the recognizing unit 4 recognizes at least one recognition-target object included in the image data obtained by the obtaining unit 3.

Furthermore, without performing the recognizing process described above on all of the plurality of pieces of image data obtained by the obtaining unit 3, the recognizing unit 4 may set a key frame on which the recognizing process is to be performed for every predetermined time, thereby reducing process cost.

FIG. 3 is a diagram of an example of a data structure of feature points associated by the recognizing unit 4. In FIG. 3, a feature point location is defined by a distance (x, y) from a reference location when the reference location (for example, a location at an upper left corner of an image) is taken as a point of origin. A direction is defined by a direction of the feature point with respect to the reference location. A feature amount vector is defined by a set of a plurality of feature amounts (for example, 128 dimensions) such as colors and shapes. At step S108 of FIG. 2, the recognizing unit 4 associates the feature point group extracted from the image obtained by the obtaining unit 3 and the feature point group of one recognition-target object selected from the storage unit 2 with each other as depicted in FIG. 3 by using corresponding IDs.

Figure 4A:
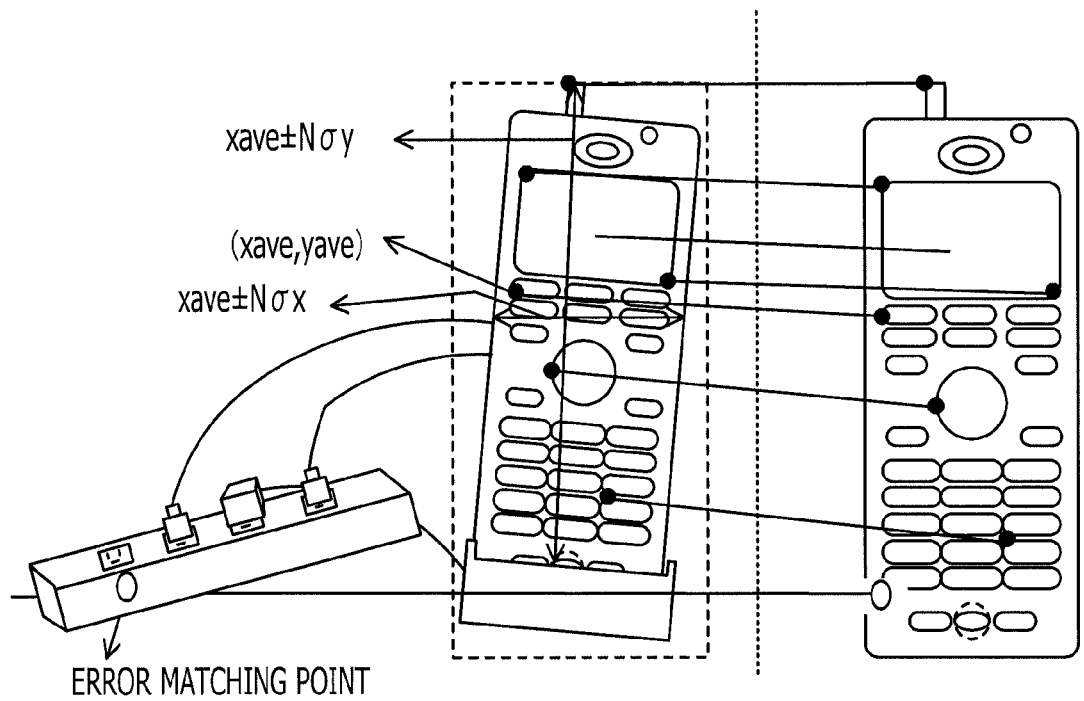
FIG. 4A is a conceptual diagram of a feature point group associated by the recognizing unit with image data obtained by an obtaining unit and a feature point group of recognition-target objects stored in a storage unit and associated by the recognizing unit.

FIG. 4A is a conceptual diagram of the feature point group (left) associated by the recognizing unit 4 with image data obtained by the obtaining unit 3 and the feature point group (right) of the recognition-target object stored in the storage unit 2 and associated by the recognizing unit 4. In FIG. 4A, associated feature points are indicated by ● (black circles) or ○ (white circles). ● indicates a feature point that correctly matches a normal feature point stored in the storage unit 2, and ○ indicates a feature point that is erroneously associated (erroneous matching). In this manner, in object recognition, it may be assumed that erroneous matching may occur on rare occasion in which a feature point of a background is associated with the feature point of the recognition-target object.

Thus, to further improve robustness, the recognizing unit 4 may use a feature point set U1 in which both coordinate values of a feature point location (x, y) are within an average value of the sets U0±Nσ, among all feature point sets (U0), for the recognizing process. Specifically, from the feature point sets (U0), coordinate averages ($x_{ave}$, $y_{ave}$) and deviations σx and σy are calculated. Then, by restricting a feature point range to be adopted as an object region to $x_{ave}$±Nσx and $y_{ave}$±Nσy, a feature point very far away from average coordinates (a feature point assumed as erroneous matching) may be excluded. Here, N is set at 2.5, for example. FIG. 4B is a diagram of an example of a data structure of feature points with improved robustness. Data with an ID number of 5 corresponds to a feature point with ○ (white circle) in FIG. 4A. By deleting the data with the ID number of 5, robustness of the recognizing process by the recognizing unit 4 is further improved.

(Process Flow of the Calculating Unit 5)

Figure 5:
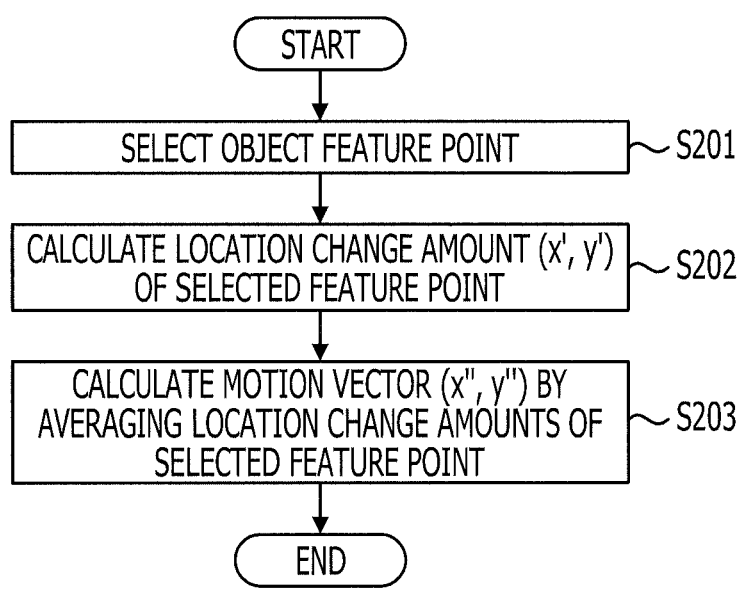
FIG. 5 is a flowchart of a process by a calculating unit of calculating a location change amount and a motion vector of a feature point of a recognition-target object.

FIG. 5 is a flowchart of a process by the calculating unit 5 of calculating a location change amount and a motion vector of the feature point of the recognition-target object. First, the calculating unit 5 selects a feature point of the recognition-target object for which a location change amount is to be calculated, from the feature point group of the recognition-target object recognized by the recognizing unit 4 (step S201). All of the feature points of the recognition-target object recognized by the recognizing unit 4 may be used, or any number of feature points may be selected in consideration of process cost.

The calculating unit 5 next calculates a location change amount (x', y') of each feature point selected at step S201 by using, for example, an optical flow (step S202). In the optical flow, the same feature points in successive frames of image data imaged at different times are associated with each other, and a movement amount of the feature points are represented as vector data. For the optical flow, a related technology such as a block matching method or a gradient method may be used. Note that the calculating unit 5 may set an upper limit of the movement amount as desired in order to improve robustness of calculation of a location change amount of the feature point of the recognition-target object, thereby determining validity of the movement amount.

The calculating unit 5 next averages the location change amounts of the respective feature points calculated at step S202 to calculate a motion vector (x", y") of the recognition-target object from the average (step S203). The motion vector has a data structure such that a motion vector of a frame t at the current time is (9.3, −3.9), motion vector of a frame t−1 at a previous time is (9.9, −2.8), and a motion vector of a frame t−2 at a previous time is (8.1, −1.3). In this case, the x direction is a diagonally downward direction and the y direction is a diagonally upward direction in the motion vectors of these successive three frames. The calculating unit 5 may take a vector obtained by synthesizing the motion vectors in the x direction and the y direction as a motion vector of the recognition-target object, or may take a motion vector obtained by focusing on a predetermined direction as a motion vector of the recognition-target object. In this manner, the calculating unit 5 calculates location change amounts of the feature points in the recognition-target object from the plurality of pieces of image data, and calculates motion vectors from the location change amounts.

(Process Flow of the Determining Unit 6)

FIG. 6A is a flowchart of a process by the determining unit 6 of determining a user movement based on the motion vector of the recognition-target object. The determining unit 6 stores, in the cache or memory not depicted herein, the motion vector (x", y") of the recognition-target object calculated by the calculating unit 5 (step S301). Next, the determining unit 6 determines whether motion vectors of a predetermined number of frames have been stored (step S302). The predetermined number of frames is thirty frames, for example. When determining at step S302 that motion vectors of the predetermined number of frames have been stored, the determining unit 6 averages the stored motion vectors (step S303). The determining unit 6 then refers to a user movement correspondence table, which will be described further below, to determine a movement of the user (step S304), and deletes the stored motion vectors (step S305).

FIG. 6B depicts a user movement correspondence table in which motion vectors of a recognition-target object and user movements are associated with each other. An example in which a motion vector (x", y") calculated by averaging is (9.1, −2.6) at step S304 is described. The motion vector is close to the reference vector (10, 0) and, furthermore, is within a tolerance range of (±3, ±3) defined in advance as an allowable range, and therefore the determining unit 6 determines that the user has turned his or her head to the left.

FIG. 7 is a table in which recognition-target objects, user movements, and auxiliary information are associated with one another. The auxiliary information is stored in the storage unit 2, and may be regularly updated via a network. The display unit 7 receives, from the storage unit 2, auxiliary information of a recognition-target object corresponding to a user movement determined by the determining unit 6, and displays the auxiliary information so as to superpose the auxiliary information on the recognition-target object recognized by the recognizing unit 4.

(Second Embodiment)

In view of improving usability, process cost, and robustness, the recognizing unit 4 of FIG. 2 may calculate a motion vector of one object specified as being assumed to be the one the user is gazing at. With this, via the display unit 7, the user may confirm auxiliary information about only the object gazed by the user, thereby improving usability. Also, since the number of objects to be subjected to image processing is restricted to one, process cost of the recognizing unit 4 may be significantly reduced. Furthermore, the location change amount of a feature point of a background object is not calculated as motion vector, and therefore robustness is improved.

Figure 8:
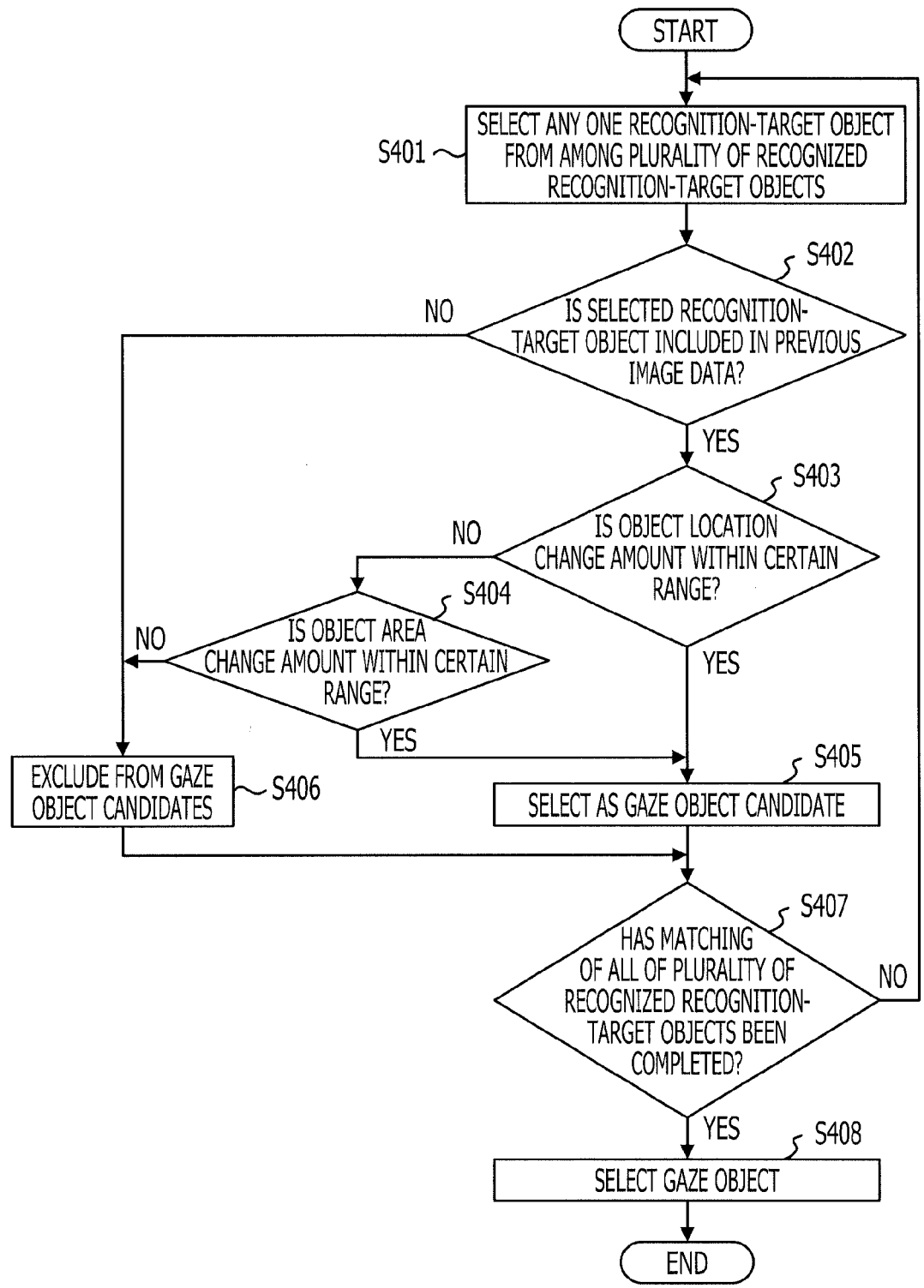
FIG. 8 is a flowchart of a process by the recognizing unit of selecting a gaze object.

FIG. 8 is a flowchart of a process by the recognizing unit 4 of selecting a gaze object. First, the recognizing unit 4 selects any one recognition-target object from among the plurality of recognized recognition-target objects (step S401). The recognizing unit 4 next determines whether the selected recognition-target object is included in previous image data previously obtained by the obtaining unit 3 (step S402). In an example of a determining method, the feature points in SIFT or SURF may be used to associate the feature points of the recognition-target object by using a current frame and previous frame to determine whether there is a feature point of the selected recognition-target object that is present across a predetermined number of frames. Consider an example in which the user is actually gazing at a product on an advertisement in a train car while riding on a train and the image data obtained by the obtaining unit 3 includes the product and trees on the background through a window. With the process at step S402, the trees on the background may be excluded from gaze object candidates (step S406).

When determining that the selected recognition-target object is included in previous image data, the process of the recognizing unit 4 may go to step S405, but in the present embodiment, determining processes at step S403 and step S404 are performed in order to further strengthen robustness. The recognizing unit 4 determines whether the location change amount of the recognition-target object selected at step S401 is within a certain range (step S403). Also at step S403, in view of process cost, it may be determined whether the change amount of a center location of the recognition-target object with respect to any reference location of the image data is within a certain range. For example, the center location of the recognition-target object may be stored in advance in the storage unit 2, or a center location of a rectangular outer frame that surrounds the feature point group of the recognition-target object obtained from the image data may be taken as a center location of the recognition-target object. The location change amount of the recognition-target object within the certain range equivalently indicates that the recognition-target object is in a stationary state and the user is gazing at that recognition-target object.

Next, when determining at step S403 that the location change amount of the recognition-target object is outside the certain range, the recognizing unit 4 determines whether an area change amount of the selected recognition-target object is within a certain range (step S404). For example, the area of the recognition-target object may be stored in advance in the storage unit 2, or an area surrounded by a rectangular outer frame that surrounds the feature point group of the recognition-target object obtained from the image data may be taken as the area of the recognition-target object. The location change amount of the recognition-target object outside the certain range and the area change amount of the recognition-target object within the certain range equivalently indicate that either one or both of the user and the recognition-target object relatively move while the user is gazing the recognition-target object.

The recognizing unit 4 selects a recognition-target object that satisfies the conditions at step S402 to step S404 as a gaze object candidate (step S405). The recognizing unit 4 next determines whether matching of all of the plurality of recognized recognition-target objects has been completed (step S407). When selecting one object as a gaze object candidate at step S408, the recognizing unit 4 selects that object as a gaze object. When selecting a plurality of objects as gaze object candidates, the recognizing unit 4 selects, for example, an object closest to the center location of the image data as a gaze object. With the method disclosed in the second embodiment described above, usability, process cost, and robustness may further be improved.

(Third Embodiment)

The calculating unit 5 may calculate a location change amount by using four endpoints containing a recognition-target object by using homography. Note that a homography is a matrix representing projective transformation of one plane to another plane in a three-dimensional space. With a method of using a homography disclosed in the present embodiment, influences of the size of the object included in the image data obtained by the obtaining unit 3 and influences of projective distortion occurring when the object is imaged in a diagonal direction may be reduced, thereby improving robustness.

FIG. 9A depicts a correspondence among feature points (○) of the recognition-target object recognized by the recognizing unit 4, four endpoints (Δ) (left) containing the recognition-target object after projective transformation by a homography matrix, and four endpoints (Δ) (right) of the recognition-target object stored in advance in the storage unit 2.

First, by using the feature point group extracted from the image obtained by the obtaining unit 3 and the feature point group of one recognition-target object selected from the storage unit 2 disclosed in FIG. 3 or FIG. 4B, a homography of the feature point group extracted from the obtained image with respect to the feature point group of one selected recognition-target object is calculated. To estimate a homography, at least four associated feature points are used. If more than four feature points have been obtained, outliner removal algorithm such as RANSAC (random sample consensus) or LMedS (least median of squares) may be used to estimate an optimum value. Next, coordinates of four endpoints of a rectangle that containing the recognition-target object are provided in advance to the storage unit 2. Then, projective transformation is performed on these four endpoints by using the homography calculated as described above. Then, in the recognition-target object included in the image data obtained by the obtaining unit 3, coordinates after the transformation of the four endpoints containing the recognition-target object may be estimated.

FIG. 9B depicts an example of a data format of locations of the four endpoints containing the recognition-target object after projective transformation by a homography matrix and locations of the four endpoints of the recognition-target object stored in advance in the storage unit 2. By calculating a location change amount with the use of these four endpoints, influences of the size of the object included in the image data obtained by the obtaining unit 3 and influences of projective distortion occurring when the object is imaged in a diagonal direction may be reduced, thereby improving robustness.

(Fourth Embodiment)

The determining unit 6 may determine a user movement by using a histogram of motion vectors. By using the histogram of motion vectors, robustness may further be strengthened with respect to the determination of a user movement. FIG. 10 is a flowchart of a process by the determining unit 6 of generating a histogram of motion vectors. Note that the determining unit 6 is assumed to have a cache or memory not depicted and have stored therein the generated histogram of motion vectors and a model histogram, which will be described further below. Note that the function of the memory or cache may be performed by the storage unit 2.

First, the determining unit 6 determines whether a motion vector has already been stored in the histogram of motion vectors (step S501). Here, the motion vector may be stored with a scalar amount obtained by synthesizing motion vectors in an x direction and a y direction being taken in units of pixel or with a scalar amount of a motion vector obtained by focusing only on a certain direction being taken in units of pixel. If even one motion vector has been stored in the histogram of motion vectors, the determining unit 6 determines whether the number of motion vectors stored in the histogram of motion vectors satisfies a maximum number of pieces of image data (a maximum number of frames) defined (step S502). The maximum number of frames is fifty, for example.

When determining at step S502 that the number satisfies the maximum number, the determining unit 6 deletes the motion vector stored in the maximum number of frames in the histogram of motion vector (step S503). The determining unit 6 next increments the number of frames in the histogram of motion vectors by one. Here, the motion vector amount stored in each frame is also shifted (step S504). In other words, the histogram of motion vectors is a FIFO-type data structure, and the number of elements is fifty, which is the maximum number of frames.

With the determining unit 6 repeating the process at step S501 to step S505 while the obtaining unit 3 continues obtaining image data, a histogram may be generated. Here, in the present embodiment, the determining unit 6 performs the following processes after step S504 to further improve robustness.

The determining unit 6 determines whether the calculating unit 5 has been able to correctly calculate a motion vector (step S505). Although details will be described further below, the image data obtained by the obtaining unit 3 may include noise such as blurring, and the case may be assumed such that a motion vector is not able to be calculated in all frames. If the calculating unit 5 has been able to calculate a motion vector at step S505, the determining unit 6 stores the motion vector calculated by the calculating unit 5 in a minimum frame number in the histogram of motion vectors (step S506). Also, if the calculating unit 5 has not been able to calculate a motion vector at step S505, the determining unit 6 stores 0 as a motion vector amount in the minimum frame number in the histogram of motion vectors (step S507).

Figure 11A:
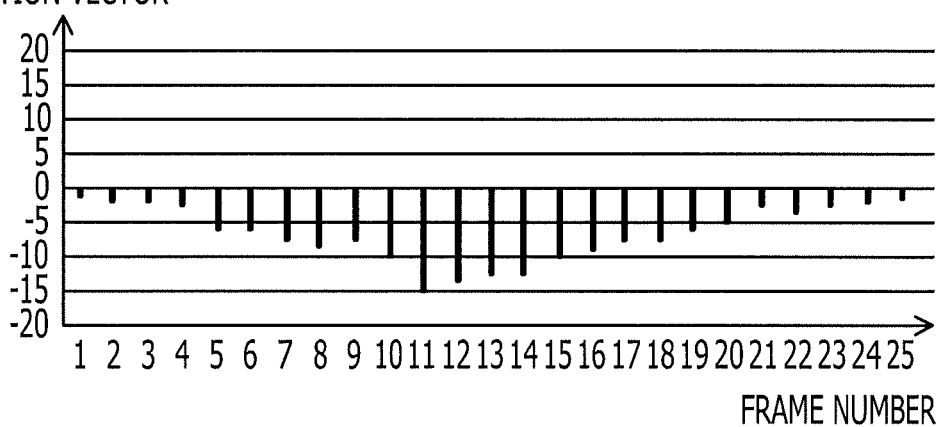
FIG. 11A is an example of the histogram of motion vectors generated by the determining unit.
Figure 11B:
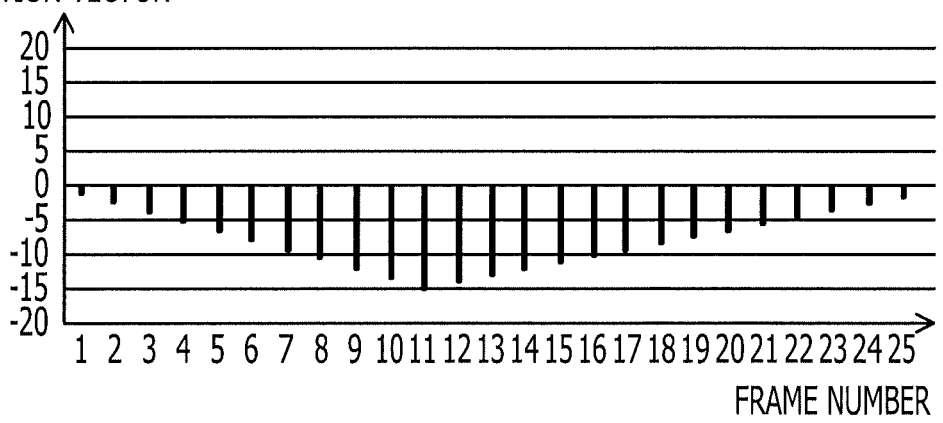
FIG. 11B is an example of a model histogram the determining unit has in advance.

FIG. 11A is an example of the histogram of motion vectors generated by the determining unit 6, and FIG. 11B is an example of the model histogram the determining unit 6 has in advance. Specifically, FIG. 11A depicts a histogram of motion vectors when the user turns his or her head in a lateral direction. With the user first being in a stationary state and then turning his or her head in the lateral direction with acceleration, the motion vector amount gradually increases and then decreases when the user is about to finish turning his or her head in the lateral direction.

The model histogram of FIG. 11B is a histogram in which movements of the head of the user as described above and motion vectors are associated with each other. As the model histogram, a histogram generated by standardizing motion vectors in advance may be used, or a histogram obtained by prior learning by the user may be used. In an example of prior learning by the user, the user is asked in advance to perform a movement of laterally turning his or her head while gazing at any recognition-target object, and a histogram of motion vectors obtained at that time is taken as a model histogram. Note that as for the length of the horizontal axis of the histogram (the number of frames), an optimum numerical value may be calculated in the stage of prior learning by the user in advance. Note that prior learning by the user may be performed with a GUI using the display unit 7 or others.

Here, the determining unit 6 determines a user movement by comparing the histogram of motion vectors and the model histogram. For comparison between the histogram of motion vectors and the model histogram, similarity computation between both histograms is used. The determining unit 6 has stored a plurality of model histograms associated with various user movements, and calculates a similarity between the respective model histograms and the motion vectors to determine a user movement associated with a model histogram with the largest similarity.

Various methods may be used for similarity computation. For example, the Bhattacharyya distance may be used. Similarity computation using the Bhattacharyya distance is disclosed in, for example, Kailath, T., "The Divergence and Bhattacharyya Distance Measures in Signal Selection", *IEEE Transactions on Communication Technology*, 15 (1), pp. 52-60, 1967.

(Fifth Embodiment)

Figure 12:
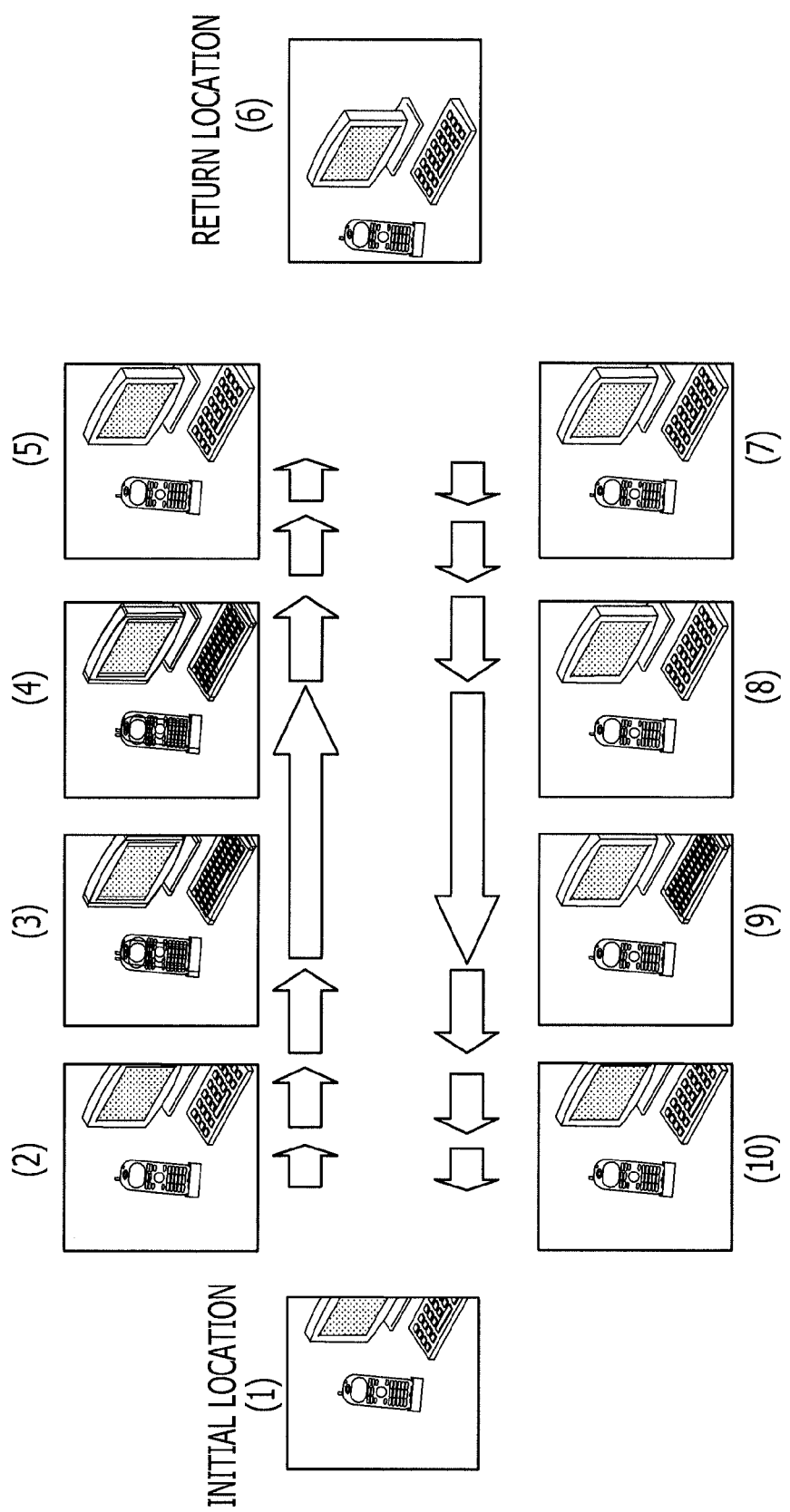
FIG. 12 is a diagram of a series of user movements when a user laterally shakes his or her head while gazing at a portable terminal and image data to be obtained by the obtaining unit.

Meanwhile, the inventors have verified that user movements have a certain unique tendency. FIG. 12 is a diagram of a series of user movements when the user laterally shakes his or her head while, gazing at a portable terminal and image data to be obtained by the obtaining unit 3. Note that FIG. 12 does not depict a tendency of a specific user but depicts a statistical tendency of a plurality of users.

At an initial location (1) of FIG. 12, the user is assumed to be gazing at a portable terminal. In (2) to (6), the user laterally shakes his or her heads while gazing at the portable terminal. In (3) and (4) of a section from (2) to (6), acceleration is too large, and blurring occurs in the image data obtained by the obtaining unit 3. If such image data is used, it is difficult to calculate a motion vector. After the user laterally shakes his or her head, the user normally returns the head to the initial location (1) in a front direction. In a section from (7) to (1), it has been newly found out that burring relatively does not occur. For this reason, the use of motion vectors in the section from (7) to (10) may improve robustness for recognizing the user movement.

In view of the new verification result described above, the determining unit 6 may determine a user movement by learning in advance a model in consideration of an outward path and a return path of a user movement as a model histogram and comparing the model histogram and a histogram in consideration of the outward path and the return path of the user movement.

FIG. 13A depicts an example of a histogram of motion vectors generated by the determining unit 6 in consideration of an outward path and a return path of the user movement of FIG. 12. It may be found that due to the occurrence of blurring in a section near frame numbers 5 to 15, 0 is stored in the histogram as motion vectors. Note that a process of storing 0 in the histogram as motion vectors corresponds to step S507 of FIG. 10. FIG. 13B depicts a model histogram in consideration of an outward path and a return path of a user movement. The determining unit 6 may determine similarity of the entire histogram, or may individually determine similarity by dividing the user movement into an outward path and a return path. Division into an outward path and a return path may be made with a point where the motion vector is switched from a plus direction to a minus direction being taken as a base point.

Note that since user movement time in consideration of the outward path and the return path is on the order of sixty frames, it is enough for the determining unit 6 to perform a process of matching the histogram of motion vectors and the model histogram once every two seconds.

Figure 14:
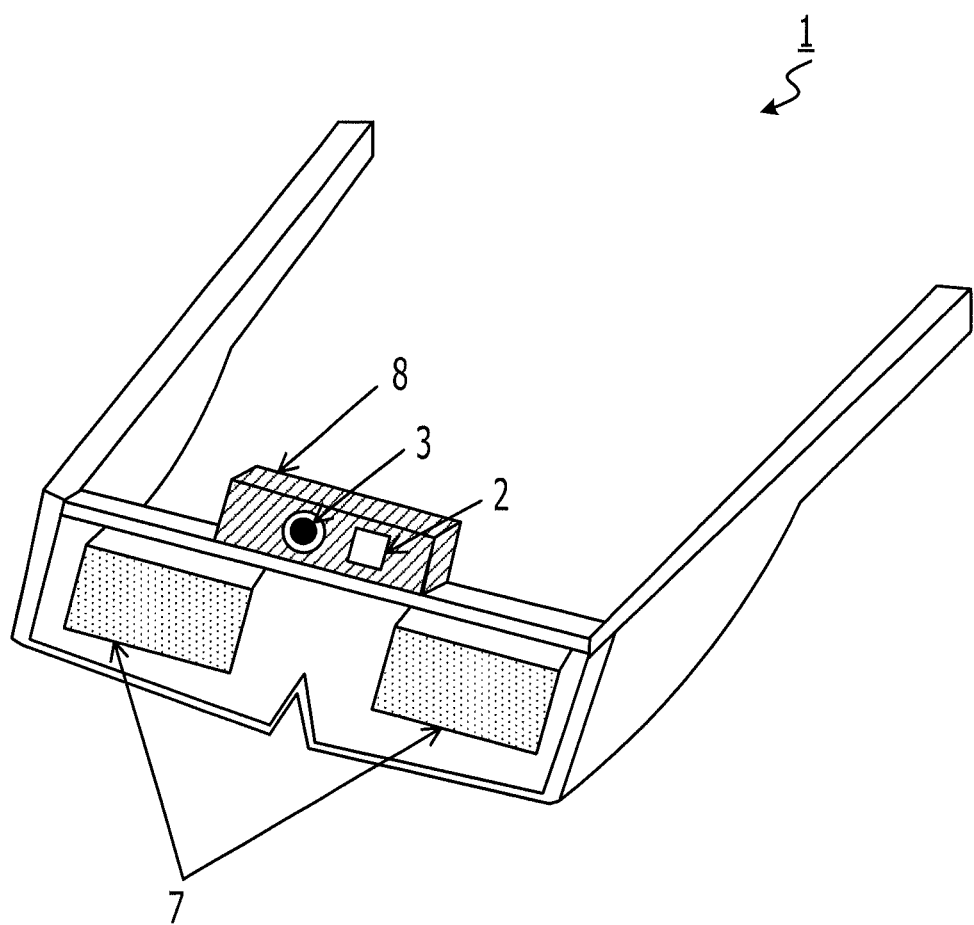
FIG. 14 is a structural diagram of an image processing device according to an embodiment.

FIG. 14 is a structural diagram of an image processing device according to an embodiment. To easily specify the recognition-target object the user is gazing at outside, the obtaining unit 3 may be placed at the center of the eyes by using a box in the shape of eyeglasses. Furthermore, although not depicted, two or more obtaining units 3 may be placed to use a stereoscopic image. As the display unit 14, a see-through-type display may be used so as to be able to recognize outside.

Also, each components of each device depicted in the drawings may not be physically configured as depicted. That is, specific modes of dispersion and unification of the devices are not restricted to those depicted in the drawings, and all or part of the devices may be configured as being functionally or physically dispersed or unified in any unit according to various loads and use situations. Also, various processes described in the embodiments described above may be performed by a computer such as a personal computer or a workstation executing a program previously provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device that accesses a storage that stores a feature point of a recognition-target object, the device comprising:
    a camera wearable by a user and when worn by the user, configured to obtain image data in a direction of a field of view of the user;
    a processor; and
    a memory which stores a plurality of instructions, which when executed by the processor, cause the processor to execute:

generating a model histogram;
recognizing the recognition-target object in the image data by extracting a feature point from the image data and associating the extracted feature point with the stored feature point of the recognition-target object,
calculating a location change amount of the feature point of the recognition-target object from a plurality of the image data obtained at different times,
calculating a motion vector of the recognition-target object from the location change amount,
determining a movement of the user based on the calculated motion vector and a user movement correspondence table in which motion vectors and user movements are in an opposite direction of the motion vectors respectively;
dividing the user movement into an outward path and a return path at a point where the motion vector is switched from a positive direction to a negative direction;
calculating a histogram of the motion vectors in consideration of the outward path and the return path; and
determining the movement of the user by comparing the histogram of the motion vectors to the model histogram in consideration of the outward path and the return path.

2. The image processing device according to claim 1, wherein an object the user is gazing at via the image processing device is used in calculation of a location change amount of the recognition-target object or an area change amount of the recognition-target object from the plurality of image data.

3. The image processing device according to claim 1, wherein the recognizing specifies a location of the recognition-target object included in the image data from the feature point of the recognition-target object and the calculating calculates the location change amount of the feature point and a location change amount of at least four endpoints containing the recognition-target object the location of which is specified.

4. The image processing device according to claim 1, wherein the storage stores a model histogram in which a movement of the user and a motion vector are associated with each other, and the determining determines the movement of the user by comparing similarity between a histogram of motion vectors generated by accumulating a predetermined amount of motion vectors calculated and the model histogram.

5. The image processing device according to claim 1, wherein the storage stores auxiliary information regarding the recognition-target object associated with the movement of the user.

6. The image processing device according to claim 5, wherein the image processing device displays the auxiliary information regarding the recognition-target object associated with the movement of the user determined.

7. An image processing method comprising:
generating a model histogram;
obtaining, from a device wearable by a user, image data in a direction of a field of view of the user when the device is worn by the user;
extracting a feature point from the image data;
reading a stored feature point of a recognition-target object stored in a storage of the device;
recognizing an object included in the image data by associating the extracted feature point with the stored feature point of the recognition-target object;
calculating, by a processor, a location change amount of the feature point of the recognized recognition-target object from a plurality of the image data obtained at different times and calculating a motion vector of the recognition-target object from the location change amount;
determining a movement of the user based on the calculated motion vector and a user movement correspondence table in which motion vectors and user movements are in an opposite direction of the motion vectors respectively;
dividing the user movement into an outward path and a return path at a point where the motion vector is switched from a positive direction to a negative direction;
calculating a histogram of the motion vectors in consideration of the outward path and the return path; and
determining the movement of the user by comparing the histogram of the motion vectors to the model histogram in consideration of the outward path and the return path.

8. The image processing method according to claim 7, wherein, in the recognizing, a location change amount of the recognition-target object or an area change amount of the recognition-target object is calculated from the plurality of image data and, based on the location change amount or the area change amount, an object the user is gazing at is recognized.

9. The image processing method according to claim 7, wherein, in the calculating, a location of the recognition-target object included in the image data is specified from the feature point of the recognition-target object, and a location change amount of at least four endpoints containing the recognition-target object the location of which is specified is calculated as the location change amount of the feature point.

10. The image processing method according to claim 7, wherein, in the determining, the movement of the user is determined by comparing similarity between a model histogram in which a movement of the user and a motion vector are associated with each other and a histogram of motion vectors generated by accumulating a predetermined amount of motion vectors calculated in the calculating.

11. The image processing method according to claim 7, wherein the storage stores auxiliary information regarding the recognition-target object associated with the movement of the user.

12. The image processing method according to claim 11, further comprising:
displaying the auxiliary information regarding the recognition-target object associated with the movement of the user determined in the determining.

13. A non-transitory computer-readable storage medium storing an image processing program that causes a computer to execute a process comprising:
generating a model histogram;
obtaining, from a device wearable by a user, image data in a direction of a field of view of the user when the device is worn by the user;
extracting a feature point from the image data;
reading a stored feature point of a recognition-target object stored in a storage;
recognizing an object included in the image data by associating the extracted feature point and the stored feature point of the recognition-target object;
calculating a location change amount at the feature point of the recognized recognition-target object from a plurality of the image data obtained at different times and calculating a motion vector of the recognition-target object from the location change amount; and determining a movement of the user based on the calculated motion vector and a user movement correspondence table in which motion vectors and user movements are in an opposite direction of the motion vectors respectively;

dividing the user movement into an outward path and a return path at a point where the motion vector is switched from a positive direction to a negative direction;

calculating a histogram of the motion vectors in consideration of the outward path and the return path; and determining the movement of the user by comparing the histogram of the motion vectors to the model histogram in consideration of the outward path and the return path.

14. The non-transitory computer-readable storage medium according to claim 13, wherein, in the recognizing, a location change amount of the recognition-target object or an area change amount of the recognition-target object is calculated from the plurality of image data and, based on the location change amount or the area change amount, an object the user is gazing at is recognized.

15. The non-transitory computer-readable storage medium according to claim 13, wherein, in the calculating, a location of the recognition-target object included in the image data is specified from the feature point of the recognition-target object, and a location change amount of at least four endpoints containing the recognition-target object the location of which is specified is calculated as the location change amount of the feature point.

16. The non-transitory computer-readable storage medium according to claim 13, wherein, in the determining, the movement of the user is determined by comparing similarity between a model histogram in which a movement of the user and a motion vector are associated with each other and a histogram of motion vectors generated by accumulating a predetermined amount of motion vectors calculated in the calculating.

17. The non-transitory computer-readable storage medium according to claim 13, wherein the storage stores auxiliary information regarding the recognition-target object associated with the movement of the user.

18. The non-transitory computer-readable medium according to claim 17, causes the computer to execute the process comprising:

displaying the auxiliary information regarding the recognition-target object associated with the movement of the user determined in the determining.

19. An image processing device that accesses a storage that stores a feature point of a recognition-target object, the device comprising:

a camera wearable by a user and when worn by the user, configured to obtain image data in a direction of a field of view of the user;

a processor; and a memory which stores a plurality of instructions, which when executed by the processor, cause the processor to, generate a model histogram;

recognize the recognition-target object included in the image data by extracting a feature point from the image data and associating the extracted feature point and a stored feature point of the recognition-target object, calculate a location change amount of the feature point corresponding to the recognition-target object recognized by the recognizing from a plurality of the image data obtained at different times, calculate a motion vector of the recognition-target object from the location change amount, determine a movement of the user based on the calculated motion vector and a user movement correspondence table in which motion vectors and user movements are in an opposite direction of the motion vectors respectively;

divide the user movement into an outward path and a return path at a point where the motion vector is switched from a positive direction to a negative direction;

calculate a histogram of the motion vectors in consideration of the outward path and the return path; and determine the movement of the user by comparing the histogram of the motion vectors to the model histogram in consideration of the outward path and the return path.

* * * * *